US006822765B1

United States Patent
Ohmori (12) 
(10) Patent No.: US 6,822,765 B1
(45) Date of Patent: Nov. 23, 2004

(54) IMAGE PROCESSING APPARATUS FOR DISPLAYING INFORMATION REGARDING FIRST IMAGE PROCESSING MODE AND SECOND IMAGE PROCESSING MODE IN IMAGE PROCESSING ARRANGEMENT HAVING FIRST IMAGE PROCESSING MODE AND SECOND IMAGE PROCESSING MODE, CONTROL METHOD OF IMAGE PROCESSING APPARATUS, AND RECORDING MEDIUM HAVING PROGRAMS

(75) Inventor: Seiji Ohmori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 563 days.

(21) Appl. No.: 09/713,303

(22) Filed: Nov. 16, 2000

(30) Foreign Application Priority Data

Nov. 19, 1999 (JP) .......................................... 11-329386

(51) Int. Cl.[7] .............................................. H04N 11/04
(52) U.S. Cl. ...................... 358/474; 358/466; 358/448
(58) Field of Search ................................ 358/474, 466, 358/448, 468; 345/700, 716, 717, 761, 764, 771

(56) References Cited

U.S. PATENT DOCUMENTS 4,734,782 A * 3/1988 Maeshima ................... 358/466
5,694,222 A * 12/1997 Yamada ....................... 358/296

FOREIGN PATENT DOCUMENTS

JP  7-203114  8/1995  ............ H04N/1/00

* cited by examiner

Primary Examiner—Edward Coles
Assistant Examiner—Heather D Gibbs
(74) Attorney, Agent, or Firm—Fitzpatrick, Cella, Harper & Scinto (57) ABSTRACT

After a display on a display unit is changed to a copy stand by screen, until an operation regarding a copy function is performed by use of an operation unit, the apparatus status regarding a facsimile function and the apparatus status regarding the copy function are displayed on the copy stand by screen to be displayed on the display unit. After the operation regarding the copy function is performed by use of the operation unit, only the apparatus status regarding the copy function is displayed on the copy standby screen.

26 Claims, 7 Drawing Sheets

STORAGE MEDIUM
SUCH AS FD, CD-ROM, ETC.

| DIRECTORY INFORMATION |
|---|
| 1ST DATA PROC PROGRAM<br>PROGRAM CODE GROUP CORRESPONDING TO STEPS OF FLOW CHART SHOWN IN FIG. 9 |
| 2ND DATA PROC PROGRAM<br>PROGRAM CODE GROUP CORRESPONDING TO STEPS OF FLOW CHART SHOWN IN FIG. 10 |
| |

MEMORY MAP OF STORAGE MEDIUM

IMAGE PROCESSING APPARATUS FOR DISPLAYING INFORMATION REGARDING FIRST IMAGE PROCESSING MODE AND SECOND IMAGE PROCESSING MODE IN IMAGE PROCESSING ARRANGEMENT HAVING FIRST IMAGE PROCESSING MODE AND SECOND IMAGE PROCESSING MODE, CONTROL METHOD OF IMAGE PROCESSING APPARATUS, AND RECORDING MEDIUM HAVING PROGRAMS

BACKGROUND OF THE INVENTION

1. Field of the Invention

The present invention relates to an image processing apparatus by which a user can easily confirm information regarding a second image processing mode on a screen for a first image processing mode, a control method of the image processing apparatus and a recording medium having programs.

2. Related Background Art

Conventionally, there has been provided various data processing apparatuses having functions different from a communication function together with the communication function.

For example, with respect to a facsimile apparatus, there provided a multifunctional machine having plural functions in a single machine which is integrally composed of a copying function, a printer function, a scanner function and the like.

In this multifunctional machine, it is general to perform a copying operation or a printer operation while performing a facsimile transmission. On a display unit of this multifunctional machine, as disclosed in Japanese Patent Application Laid-open No. 7-203114, when each function is used, such a method is adopted. That is, only need information for the function is to be displayed by changing a display screen according to a user's button-depression operation or statuses of plural functions are to be simultaneously displayed by dividing the display screen.

However, in case of being displayed only information of one function among the plural functions, there occurred a problem that an operator does not notice a status change of another function. While, in case of being displayed information of the plural functions simultaneously, there occurred a problem that the operator is confused because of a lot of displayed information.

Further, there sometimes occurred a case that it is difficult to simultaneously display information of the plural functions because of a small display portion.

SUMMARY OF THE INVENTION

An object of the present invention is to provide an image processing apparatus by which a user can easily confirm information regarding a second image processing mode on a screen for a first image processing mode, a control method of the image processing apparatus and a recording medium having programs.

More particularly, an object of the present invention is to provide an image processing apparatus capable of preventing difficulty in setting a mode occurred by displaying the information regarding the second image processing mode when the first image processing mode is set, a control method of the image processing apparatus and a recording medium having programs.

In order to achieve the above object, the present invention provides an image processing apparatus having a first image processing mode and a second image processing mode, said image processing apparatus comprising an operation panel for designating an operation regarding the first image processing mode and the second image processing mode, a display for displaying information regarding the first image processing mode and the second image processing mode and a display controller for controlling said display to display second information regarding the second image processing mode on a first display pattern including information for the first image processing mode.

Also, the present invention provides a method for controlling an image processing apparatus having a first image processing mode and a second image processing mode, said method comprising displaying first information regarding the first image processing mode and second information regarding the second image processing mode on a first display pattern including information for the first image processing mode and suppressing to display the second information in accordance with a designation regarding the first image processing mode.

Also, the present invention provides a recording medium for storing program codes which are able to be read by an image processing apparatus having a first image processing mode and a second image processing mode, said program codes comprising a first code for displaying first information regarding the first image processing mode and second information regarding the second image processing mode on a first display pattern including information for the first image processing mode, a second code for displaying first information regarding the first image processing mode on the first display pattern without displaying the second information on the first display pattern and a third code for selectively executing said first code and said second code in accordance with a presence and absence of designation regarding the first image processing mode.

Another object and features of the present invention will become apparent from the following detailed description and the attached drawings.

DESCRIPTION OF THE PREFERRED EMBODIMENTS

An embodiment of the present invention regarding a data processing apparatus, particularly regarding a facsimile/copy multifunctional apparatus will be described hereinafter with reference to the attached drawings.

Figure 1:
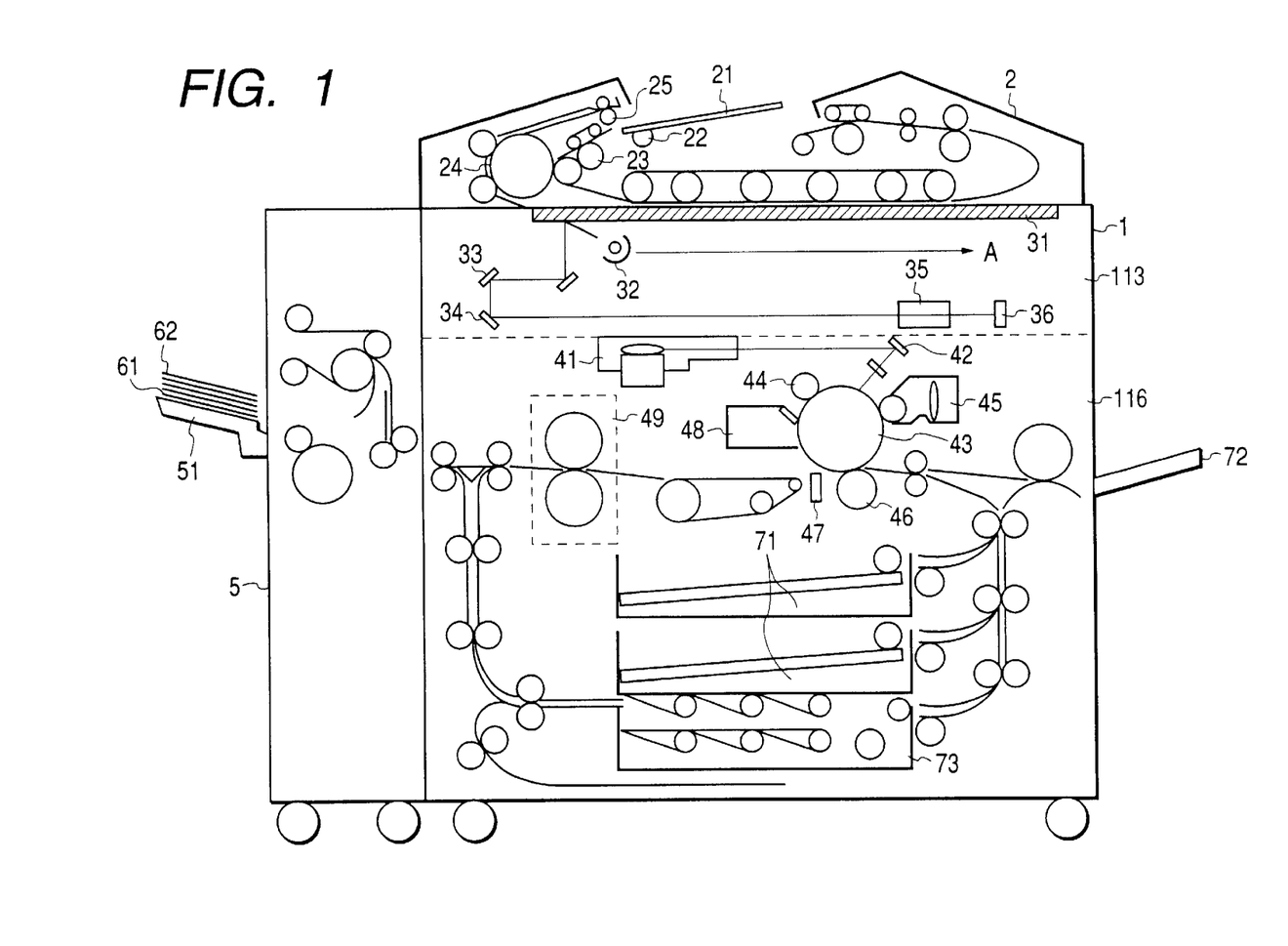
FIG. 1 is a cross sectional view showing the structure of a facsimile/copy multifunctional apparatus to which a data processing apparatus indicating one embodiment of the present invention is applicable.

FIG. 1 is a cross sectional view showing the structure of the facsimile/copy multifunctional apparatus.

In FIG. 1, a scanner unit 113 reads image data from an original mounted on an original table glass 31. A printer unit 116 forms an image on a sheet such as a normal sheet, an OHP sheet or the like on the basis of the image data read by the scanner unit 113 and image data received through a public line (PSTN line 109, ISDN line 111 or the like shown in FIG. 2 to be described later). A sheet processing device 5 assorts sheets on which images are formed by the printer unit 116.

As shown in FIG. 1, the facsimile/copy multifunctional apparatus of the present embodiment is composed of the scanner unit 113 provided on an its upper portion, the printer unit 116 provided in an its internal upper portion and the sheet processing device 5 provided at a sheet discharging unit. The facsimile/copy multifunctional apparatus has an automatic original feed device 2 on an its upper surface, a sheet feed cassettes 71 for stacking recording sheets in an its internal middle portion, a manual insertion tray 72 for mainly feeding OHP sheets and a both faces tray 73 used for forming images on both faces of a recording sheet in an its internal lower portion.

As the automatic original feed device 2 automatically feeds the original onto the original table glass 31, a tray 21 holds the original to be copied. A feed roller 22 feeds the original mounted on the original tray 21. A carriage roller 23 carries the original fed by the feed roller 22. A reversible rotation roller 24 reversibly rotates the original in case of scanning both faces of the original. A discharge roller 25 discharges the scanned original.

Like this, the automatic original feed device 2 has the original tray 21, the feed roller 22, a separation belt for picking up the originals one by one, the carriage roller 23, a resist roller for carrying only the one picked up original onto the original table glass 31, the reversible rotation roller 24 and the discharge roller 25.

The originals set on the original tray 21 by the automatic original feed device 2 are carried onto the original table glass 31 one by one, then the originals are discharged after performing a copy scan.

An exposure device 32 moves to the direction indicated by an arrow A shown in FIG. 1 while irradiating the original (not shown) set onto the original table glass 31 and scans the original. A CCD image sensor (to be referred as CCD hereinafter) 36 outputs image data by reading reflection light from the original guided by mirrors 33 and 34 and a lens 35.

At first, when the original is set onto the original table glass 31 and a copy start instruction is inputted, the exposure device 32 moves to the direction indicated by the arrow A while irradiating the original and scans the original. Light irradiated by the exposure device 32 is reflected from the original to be read by the CCD 36 via the mirrors 33 and 34 and the lens 35. The image data outputted from the CCD 36 is recorded in an image memory.

A laser unit 41 generates a laser beam on the basis of the image data read by the CCD 36 or inputted image data. The laser beam is irradiated on a photosensitive drum 43 via a mirror 42. An electrostatic latent image is formed on the photosensitive drum 43 by the irradiated laser beam.

A charger 44 electrifies the photosensitive drum 43. A developer 45 develops the electrostatic latent image on the photosensitive drum 43 using a developing agent such as a toner or the like. A transfer unit 46 transfers a developing agent image on the photosensitive drum 43 to the sheet fed from the sheet feed cassettes 71, the manual insertion tray 72 and the both faces tray 73. A separation unit 47 separates the sheet from the photosensitive drum 43. A cleaning device 48 cleans the remaining recording agent on the photosensitive drum 43. A fixing device 49 fixes the developing agent image transferred to the sheet onto the sheet.

Like this, the printer unit 116 has the photosensitive drum 43, the laser unit 41, the charger 44, the developer 45, the transfer unit 46, the separation unit 47, the cleaning device 48 and the fixing device 49.

The surface of the photosensitive drum 43 is uniformly electrified by the charger 44, thereafter, the laser beam from the laser unit 41 is irradiated to the surface of the photosensitive drum 43 via the mirror 42. Therefore, the electrostatic latent image of an original image read by the scanner unit 113 or the inputted image data is formed onto the surface of the photosensitive drum 43.

This electrostatic latent image is developed by the developer 45 and the developed developing agent image is transferred to the sheet fed from the sheet feed cassettes 71, the manual insertion tray 72 and the both faces tray 73 by the transfer unit 46, then an image is formed onto the sheet.

After the transference, the developing agent remained on the surface of the photosensitive drum 43 is removed by the cleaning device 48. The separation unit 47 separates the sheet from the photosensitive drum 43. Thereafter, the sheet is carried to the fixing device 49 to fix the developing agent onto the sheet. The fixing processed sheet is carried to the discharge unit.

In case of performing the copy for the both faces of the sheet, after the fixing process, the sheet is reversibly rotated, then carried to the both faces tray 73 and the sheet is fed to the printer unit 116 again. Thus, an image is formed onto the back face of the sheet.

The sheet processing device 5 includes a sorter and a finisher, and the sheets are discharged to a discharge tray (sort bin or stack tray) with the assorted status. The sheet processing device 5 shown in FIG. 1 is the finisher.

A discharge tray 51 stacks sheets 61 and 62 to be discharged.

It should be noted that the facsimile/copy multifunctional apparatus, to which the data processing device of the present invention is applicable, may be an electrophotographic system, an ink jet system, a thermal transfer system, a sublimation system or another recording system.

Figure 2:
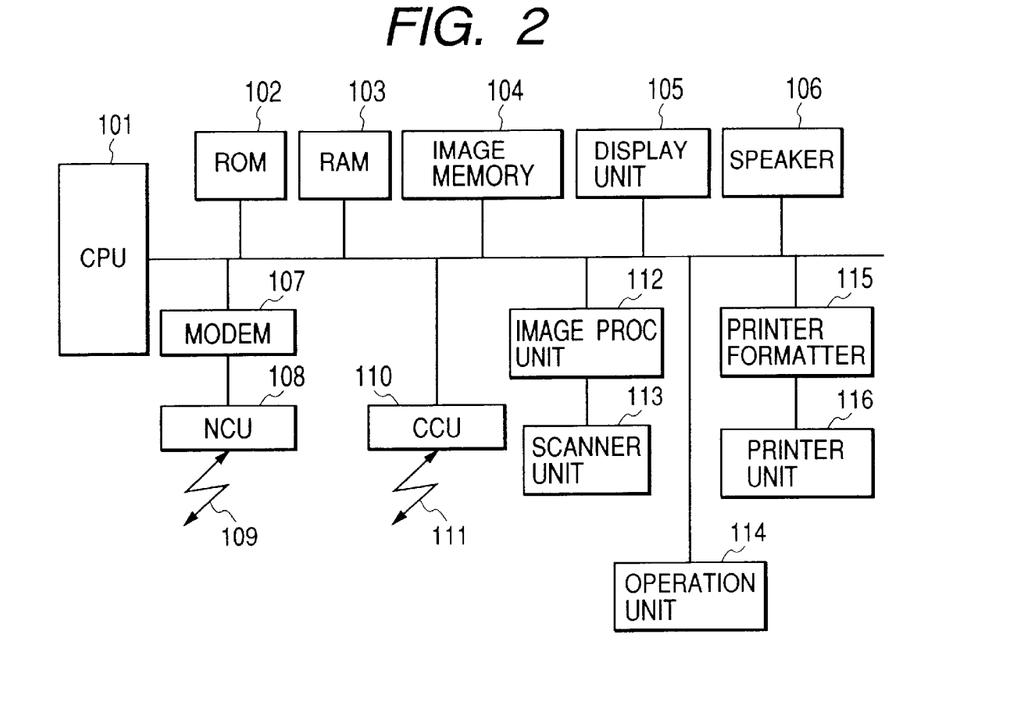
FIG. 2 is a block diagram showing the structure of the facsimile/copy multifunctional apparatus to which the data processing apparatus according to the present invention is applicable.

FIG. 2 is a block diagram showing the structure of the facsimile/copy multifunctional apparatus.

In FIG. 2, a CPU 101 integrally controls the entire facsimile/copy multifunctional apparatus on the basis of programs stored in a ROM 102 or another storage medium (not shown). The ROM 102 stores a control program of the CPU 101. A RAM 103 structured by an SRAM, an NVRAM or the like stores a program control parameter or the like, various setting values registered by an operator and management data of the apparatus. The RAM 103 is used as a work area of various buffers for the work and the CPU 101.

An image memory 104 composed of a DRAM and the like accumulates the image data. A display unit 105 which includes an LCD, an LED and the like supplies information regarding the facsimile/copy multifunctional apparatus to a user. A speaker 106 reports a notification and a caution to the user by voice sound and outputs signal sound being transmitted and received through the PSTN line 109 and the ISDN line 111.

A MODEM 107 modulates and demodulates a transmission/reception signal from/to a facsimile device. An NCU (network control unit) 108 has a function of transmitting a selection signal (dial pulse or tone dialer) to the PSTN (analog public switched telephone network) line 109 and performs an automatic call reception operation by detecting a call signal.

A CCU (communication control unit) 110 performs a line control so as to connect the apparatus to the ISDN (Integrated Services Digital Network) line 111. An image processing unit 112 executes correction processing to the read image data so as to output high quality image data. As mentioned above, the scanner 113 is composed of a CS image sensor, an original carriage mechanism and the like and reads the original to convert it into image data.

An operation unit 114 composed of a keyboard, a touch panel and the like having various keys is used by an operator to perform various input operations. When the various keys of the operation unit 114 are depressed or touched, signals corresponding to the various keys are inputted to the CPU 101. When file data from an external device such as a work station is printed, a printer formatter 115 analyzes a printer description language in the file data to convert it to image data. The printer unit 116 records images received through the NCU 108 and the CCU 109, images read by the scanner unit 113 and images based on the file data onto the sheets.

Figure 3:
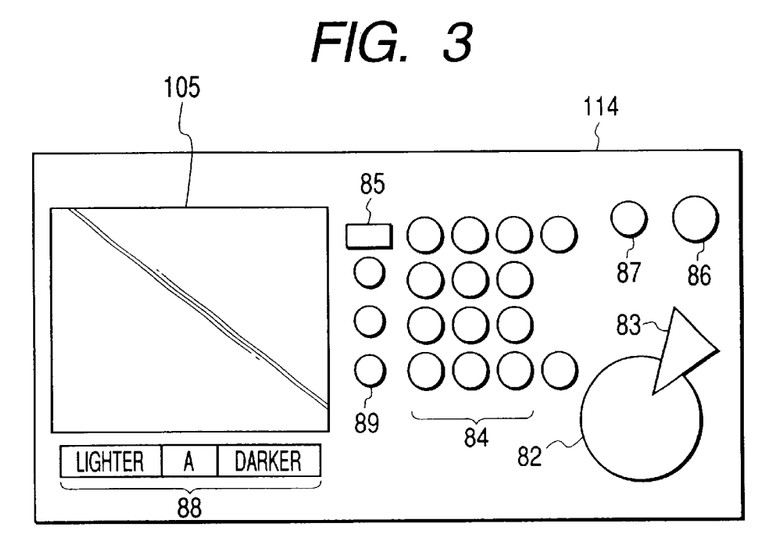
FIG. 3 is a plane view for explaining the structure of an operation unit and an external display unit of the facsimile/copy multifunctional apparatus.

FIG. 3 is a plane view for explaining the structure of the operation unit 114 of the facsimile/copy multifunctional apparatus and the external display unit 105.

The display unit 105 is composed of a display portion structured by liquid crystal elements or the like and a detection portion for detecting the depressed pressure on a surface given by the operator and is controlled by the CPU 101 shown in FIG. 2. The CPU 101 controls to display information regarding the apparatus and the keys on the display unit 105. The detection portion of the display unit 105 notifies information of a position touched by the user to the CPU 101. The CPU 101 judges that what key is touched on the basis of that position information. According to the judgment, a function or a choice corresponding to the key displayed on the display unit 105 is selected.

A start key 82 is used for starting a facsimile operation and a copy operation. A stop key 83 is used for stopping the facsimile operation and the copy operation. Ten keys 84 are used for inputting a numerical value such as a telephone number, the number of copying sheets or the like. A reset key 85 is used for turning back setting of the facsimile operation and the copy operation to an initial status.

When a facsimile mode button 86 is depressed, a mode is changed from a copy mode to a facsimile mode. When a copy mode button 87 is depressed, the mode is changed from the facsimile mode to the copy mode.

A density key 88 is used for setting copy density to lighter/darker or used for setting the copy density to an automatic density. An image quality key 89 is used for setting image quality of characters, pictures or the like. It should be noted that the setting inputted by the operation unit 114 is held in the RAM 103.

Figure 4:
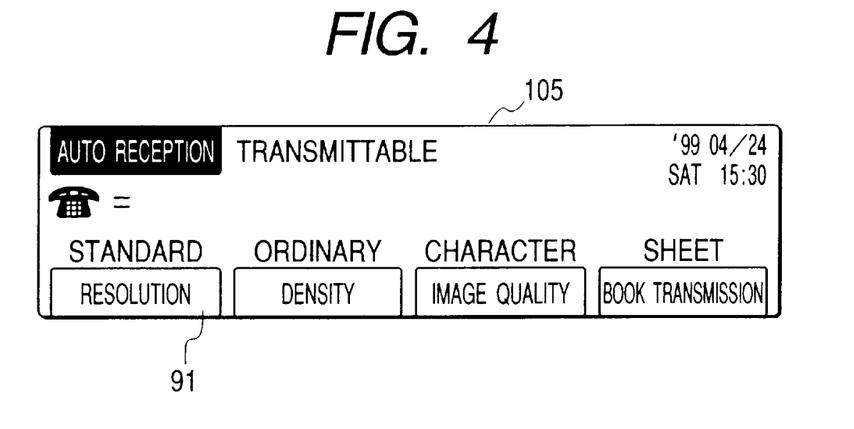
FIG. 4 is a schematic view showing an example of a first facsimile transmission standby status display screen of the data processing apparatus according to the present invention.

FIG. 4 shows a first display screen in a facsimile transmission standby status, and this screen is displayed on the display unit 105.

Figure 5:
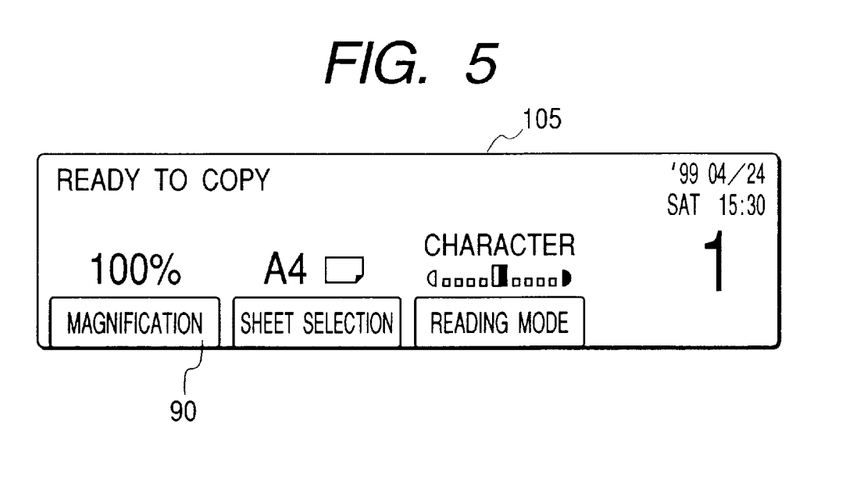
FIG. 5 is a schematic view showing an example of a first copy standby status display screen of the data processing apparatus according to the present invention.

FIG. 5 shows a first display screen in a copy standby status, and this screen is displayed on the display unit 105.

Figure 6:
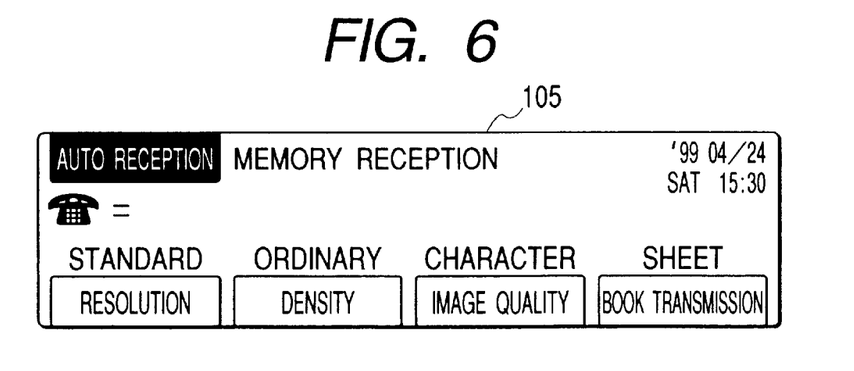
FIG. 6 is a schematic view showing an example of a second facsimile transmission standby status display screen of the data processing apparatus according to the present invention.

FIG. 6 shows a second display screen in the facsimile transmission standby status, and this screen is displayed on the display unit 105.

Figure 7:
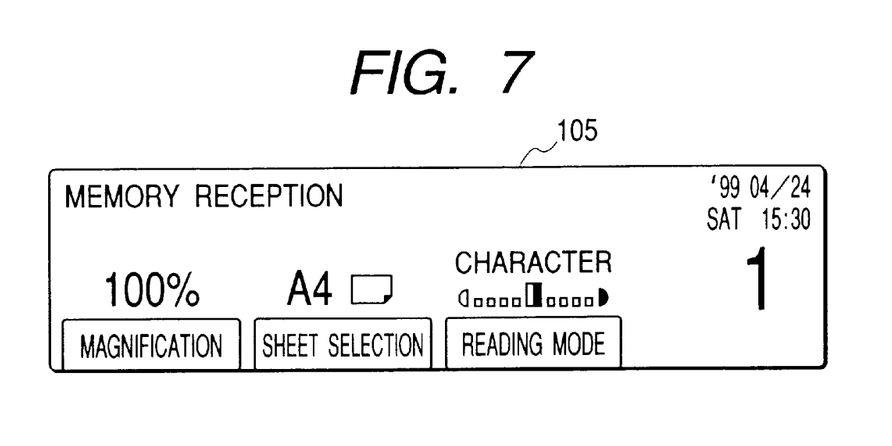
FIG. 7 is a schematic view showing an example of a second copy standby status display screen of the data processing apparatus according to the present invention.

FIG. 7 shows a second display screen in the copy standby status, and this screen is displayed on the display unit 105.

Changing between the facsimile transmission standby status and the copy standby status is performed by the facsimile mode button 86 and the copy mode button 87. That is, when the facsimile mode button 86 is depressed in the copy standby status, the status is shifted to the facsimile transmission standby status. When the copy mode button 87 is depressed in the facsimile transmission standby status, the status is shifted to the copy standby status.

In the present embodiment, the facsimile mode button 86 and the copy mode button 87 are independently provided. However, it may be structured that only a mode change button is provided. That is, if the button is depressed when the facsimile transmission standby status, the status is changed to the copy standby status, and if the button is depressed when the copy standby status, the status is changed to the facsimile transmission standby status. Further, it may be structured that the status is automatically shifted to the facsimile transmission standby status corresponding to the facsimile reception in the copy standby status.

Messages indicating the status of the facsimile/copy multifunctional apparatus of the present embodiment are "transmittable" and "ready to copy" as shown in FIGS. 4 and 5, and as other messages, there are "memory reception" (FIGS. 6 and 7), "private reception", "recording sheet jamming", "supply recording sheets", "check original", "check printer" and the like.

For example, the message of "memory reception" shown in FIGS. 6 and 7 is displayed when such the status that the image data is received in the image memory 104.

An operation of the facsimile/copy multifunctional apparatus according to the present invention will be described in detail hereinafter with reference to an example of the status that the image data is received in the image memory 104.

In the facsimile transmission standby status, when the received image data is stored in the image memory 104, the message of "transmittable" (FIG. 4) and the message of "memory reception" (FIG. 6) are alternately displayed on a facsimile transmission standby screen.

In the facsimile/copy multifunctional apparatus according to the present invention, in case of shifting the copy standby status upon depressing the copy start button 87 at the operation unit 114, when the received image data is stored in the image memory 104, the message of "ready to copy" (FIG. 5) and the message of "memory reception" (FIG. 7)

are alternately displayed on a copy standby screen. The message of "memory reception" (FIG. 7) on the copy standby screen is stopped to display corresponding to performance of any operation regarding the copy function and only the message of "ready to copy" (FIG. 5) is to be displayed on the copy standby screen.

That is, after shifting to the copy standby screen, until any operation regarding the copy function is performed, the message (FIG. 7) regarding the facsimile function and the message (FIG. 5) regarding the copy function are alternately displayed. Thereafter, corresponding to performance of any operation regarding the copy function, only the message regarding the copy function is to be displayed even if the received image data is stored in the image memory 104.

Here, the "any operation regarding the copy function" means an input of the number of copies by depressing the ten keys 84, setting of copy magnification by depressing a magnification key 90, setting of copy density by depressing the density key 88, setting of image quality by depressing the image quality key 89 or the like.

Further, in the copy standby status, when such the status that only the message of "ready to copy" (FIG. 5) is displayed, corresponding to the depression of the reset key 85 at the operation unit 114 and the elapse of a predetermined time while any operation has not been performed at the operation unit 114 and the display unit 105, changing to an alternate display of displaying the message of "memory reception" (FIG. 7) and the message of "ready to copy" (FIG. 5).

Thereafter, the operation regarding the copy function is further performed, only the message of "ready to copy" (FIG. 5) is to be displayed. After terminating a consecutive copying operation, the message of "memory reception" (FIG. 7) and the message of "ready to copy" (FIG. 5) are alternately displayed.

Figure 8:
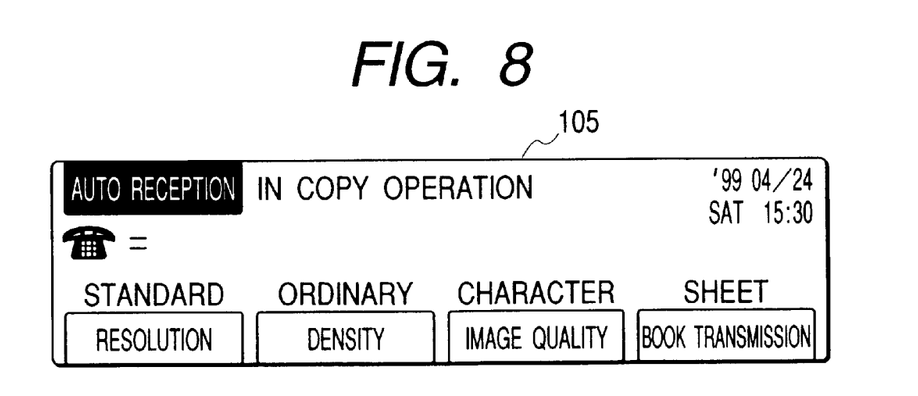
FIG. 8 is a schematic view showing an example of a third facsimile transmission standby status display screen of the data processing apparatus according to the present invention.

FIG. 8 shows a third display screen in the facsimile transmission standby status and this screen is displayed on the display unit 105.

In case of being performed the copy operation in the facsimile transmission standby status, after shifting to the facsimile transmission standby screen, until any operation regarding the facsimile function is performed, the message regarding the facsimile function (FIG. 4) and the message regarding the copy function (FIG. 8) are alternately displayed. Thereafter, corresponding to performance of any operation regarding the facsimile function, only the message (FIG. 4) regarding the facsimile function is to be displayed even if the copy operation is performed.

Here, the "any operation regarding the facsimile function" means an input of telephone number by depressing the ten keys 84, setting of print density by depressing the density key 88, setting of image quality by depressing the image quality key 89, setting of reading resolution by depressing a resolution key 91 or the like.

Figure 9:
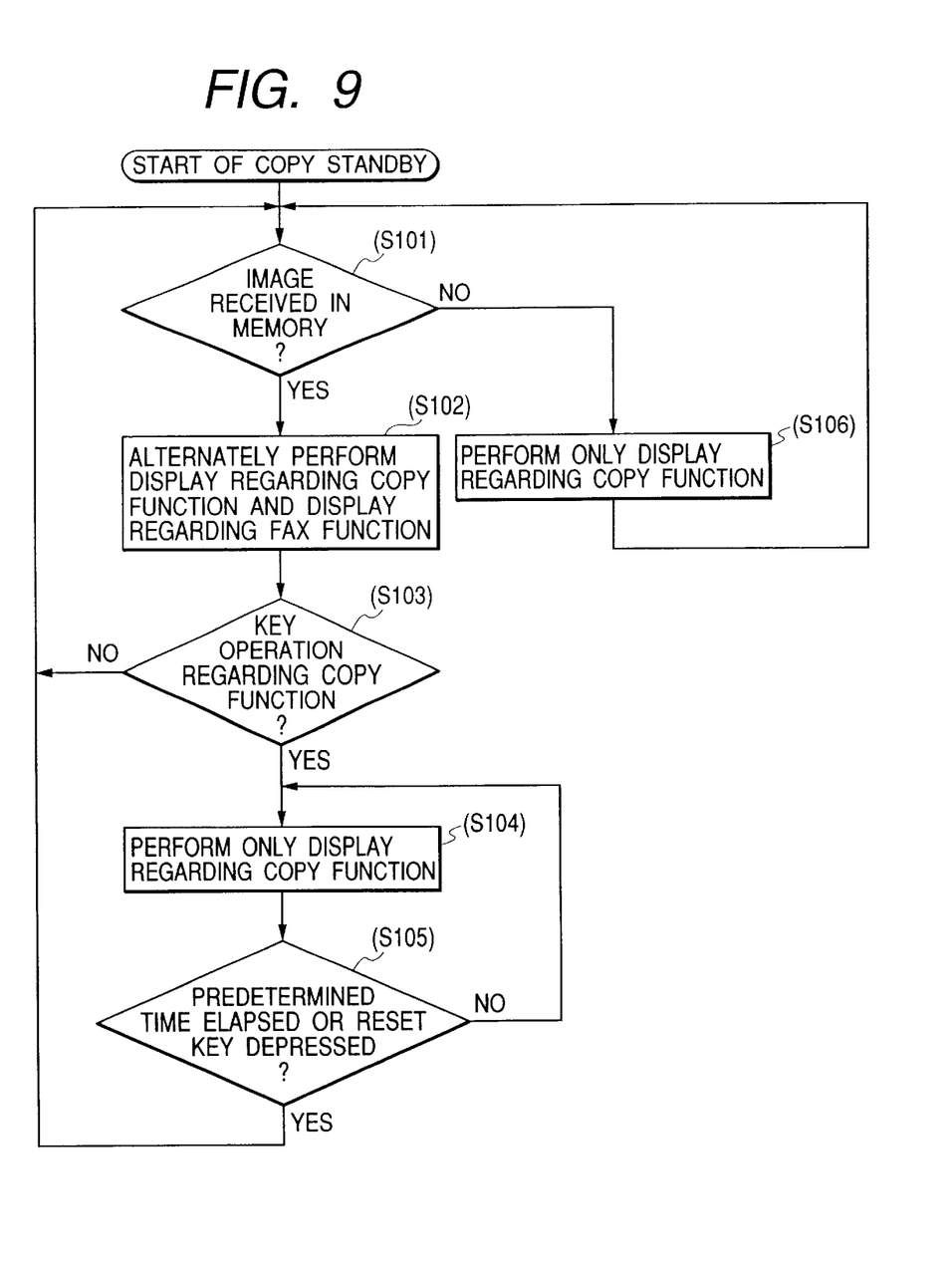
FIG. 9 is a flow chart showing an example of a first control processing operation of the data processing apparatus of the present invention.

FIG. 9 is a flow chart of a display control of the display unit 105 in the copy standby status of the facsimile/copy multifunctional apparatus. A program corresponding to the flow chart shown in FIG. 9 is stored in the ROM 102 or another storage medium (not shown), and the CPU 101 executes processing shown FIG. 9 on the basis of this program.

By depressing the copy mode button 87, a changing signal for changing mode to the copy mode is inputted to the CPU 101, which changes the mode to the copy mode. Corresponding to the fact that the status is shifted to the copy standby status, the CPU 101 executes the processing indicated by the flow chart shown in FIG. 9. At first, in a step S101, it is judged whether or not image data is received in the image memory 104. When it is judged that the image data is not received in the image memory 104, only the message of "ready to copy" (FIG. 5) regarding the copy function is displayed in a step S106. That is, a display regarding the facsimile function on the copy standby screen is suppressed.

On the other hand, in the step S101, when it is judged that the image data is received in the image memory 104, the message of "memory reception" (FIG. 6) regarding the facsimile function and the message of "ready to copy" (FIG. 5) regarding the copy function are alternately displayed on the copy standby screen in a step S102.

Next, in a step S103, it is judged whether or not any operation regarding the copy function is performed at the operation unit 114. When it is judged that the operation regarding the copy function is not performed, the flow is returned to the step S101 as it is. On the other hand, when it is judged that the operation regarding the copy function is performed, the message of "memory reception" (FIG. 7) on the copy standby screen is suppressed to display, and only the message of "ready to copy" (FIG. 5) regarding the copy function is to be displayed in a step S104.

Next, in a step S105, it is judged whether or not a predetermined time after starting a display in the step S104 has been elapsed or the reset key 85 was depressed, and if it is judged that the predetermined time is not yet elapsed and the reset key 85 is not depressed, the flow is returned to the step S104, and only the message of "ready to copy" (FIG. 5) regarding the copy function is to be displayed. The CPU 101 has a timer by which it is judged whether or not the predetermined time is elapsed. Also, the CPU 101 judges whether or not the reset key 85 is depressed on the basis of a signal which is generated by depressing the reset key 85.

On the other hand, in the step S105, when it is judged that the predetermined time has been elapsed or the reset key 85 was depressed, the flow is returned to the step S101. That is, suppression of the display in the step S104 is canceled.

It should be noted that the "predetermined time" being judged in the step S105 may be stored in the ROM 102 or may be stored in an NVRAM in the RAM 103 by inputting it from the operation unit 114 by the user.

Figure 10:
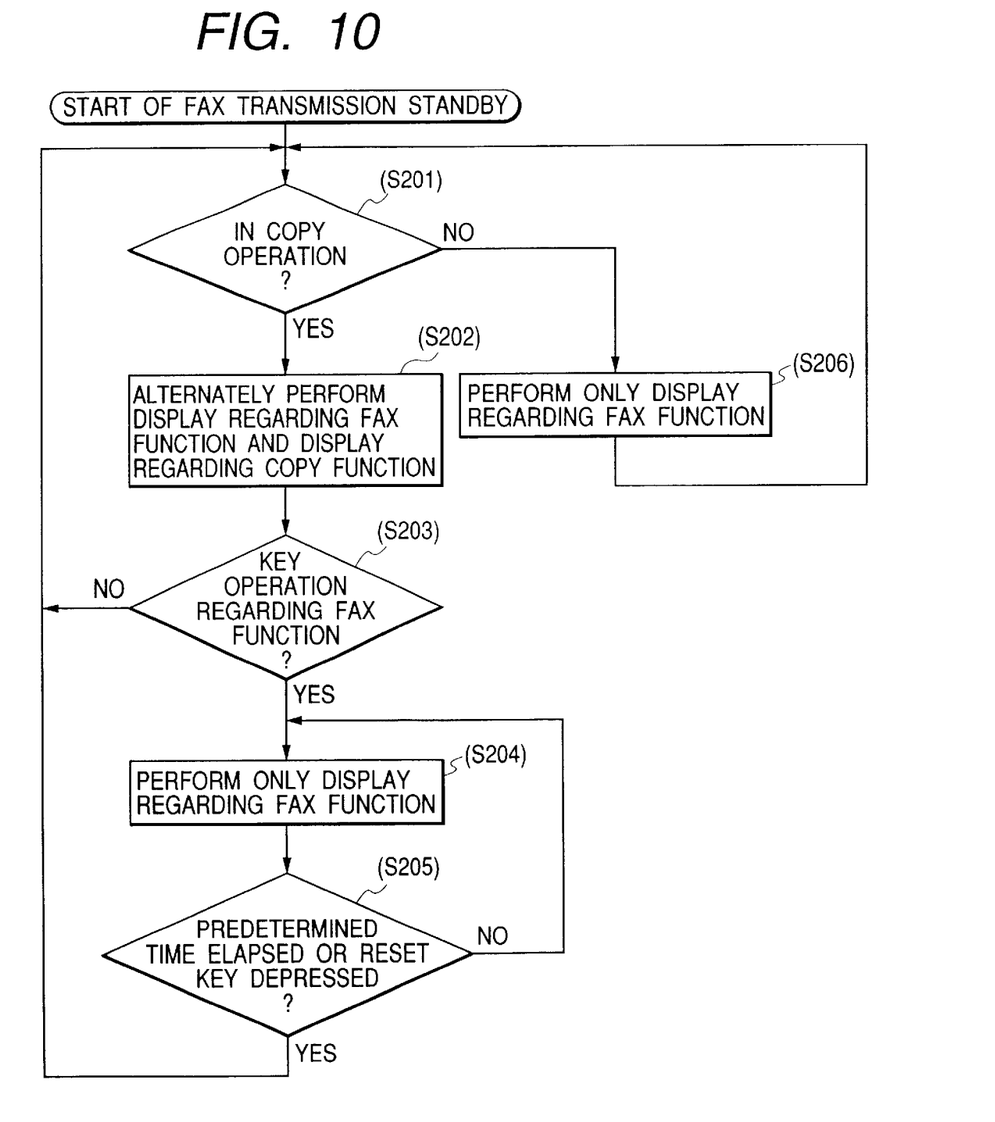
FIG. 10 is a flow chart showing an example of a second control processing operation of the data processing apparatus of the present invention.

FIG. 10 is a flow chart of a display control of the display unit 105 in the facsimile transmission standby status of the facsimile/copy multifunctional apparatus. A program corresponding to the flow chart shown in FIG. 10 is stored in the ROM 102 or another storage medium (not shown), and the CPU 101 executes processing shown in FIG. 10 on the basis of this program.

By depressing the facsimile mode button 86, a changing signal for changing mode to the facsimile transmission mode is inputted to the CPU 101, which changes the mode to the facsimile transmission mode. Corresponding to the fact that the status is shifted to the facsimile standby status, the CPU 101 executes processing indicated by the flow chart shown in FIG. 10. At first, in a step S201, it is judged whether or not a copy operation is running in a background. When it is judged that the copy operation is not running in the background, only the message of "transmittable" (FIG. 4) regarding the facsimile function is displayed in a step S206. That is, a display regarding the copy function on the facsimile transmission standby screen is suppressed.

On the other hand, in the step S201, when it is judged that the copy operation is running, a message of "in copy operation" (FIG. 8) regarding the copy function and the message of "transmittable" (FIG. 4) regarding the facsimile function are alternately displayed on the facsimile transmission standby screen in a step S202.

Next, in a step S203, it is judged whether or not any operation regarding the facsimile function is performed at the operation unit 114. When it is judged that the operation regarding the facsimile function is not performed, the flow is returned to the step S201 as it is. On the other hand, when it is judged that the operation regarding the facsimile function is performed, the message of "in copy operation" (FIG. 8) on the facsimile transmission standby screen is suppressed to display, and only the message of "transmittable" (FIG. 4) regarding the facsimile function is to be displayed in a step S204.

Next, in a step S205, it is judged whether or not a predetermined time after starting a display in the step S204 has been elapsed or the reset key 85 was depressed, and if it is judged that the predetermined time is not yet elapsed and the reset key 85 is not depressed, the flow is returned to the step S204, and only the message of "transmittable" (FIG. 4) regarding the facsimile function is to be displayed.

On the other hand, in the step S205, when it is judged that the predetermined time has been elapsed or the reset key 85 was depressed, the flow is returned to the step S201. That is, suppression of the display in the step S204 is canceled.

It should be noted that the "predetermined time" being judged in the step S205 may be stored in the ROM 102 or may be stored in the NVRAM in the RAM 103 by inputting it from the operation unit 114 by the user.

In the present embodiment, an example of alternately displaying two messages, particularly the "memory reception" and the "ready to copy" is given. However, in case of sequentially displaying more than (or equal to) three messages, the same method can be used.

On the display unit 105 of the present embodiment, a method of alternate display is used when plural messages are displayed. However, the plural messages may be simultaneously displayed on the display unit 105.

It should be noted that the above control processing operation is to be performed by the CPU 101 on the basis of the program stored in the ROM 102 or the RAM 103, however, the present invention may be constituted that the program is stored in various storage media such as a floppy disk, a hard disk, an optical disk, a magnetooptical disk, a CD-ROM, a DVD-ROM, a memory card, a magnetic tape and the like, and the stored program is downloaded to an information processing apparatus such as a computer or the like or the facsimile apparatus by an exclusive reading device, and the CPU 101 executes the downloaded program.

In the above embodiment, the description is given by an example of the facsimile/copy multifunctional apparatus. However, the present invention is not limited to this. Namely, for example, the present invention is similarly applicable to a data processing apparatus (communication apparatus) of which communication function is combined with a printer function, a scanner function, an electronic filing function, a data processing function and the like, a data processing apparatus (communication apparatus) which is separated from a reading circuit or a storage circuit, or a data communication control in the information processing apparatus such as a computer.

As described above, according to the present invention, it becomes possible to prevent lack of information for the operator and confusion of the operator due to an excessive supply of the information by changing the information regarding each function to be displayed on a display unit corresponding to an operating situation of the operator.

Hereinafter, the structure of a data processing program which can be read out by the data processing apparatus according to the present invention will be described with reference to a memory map shown in FIG. 11.

Figure 11:
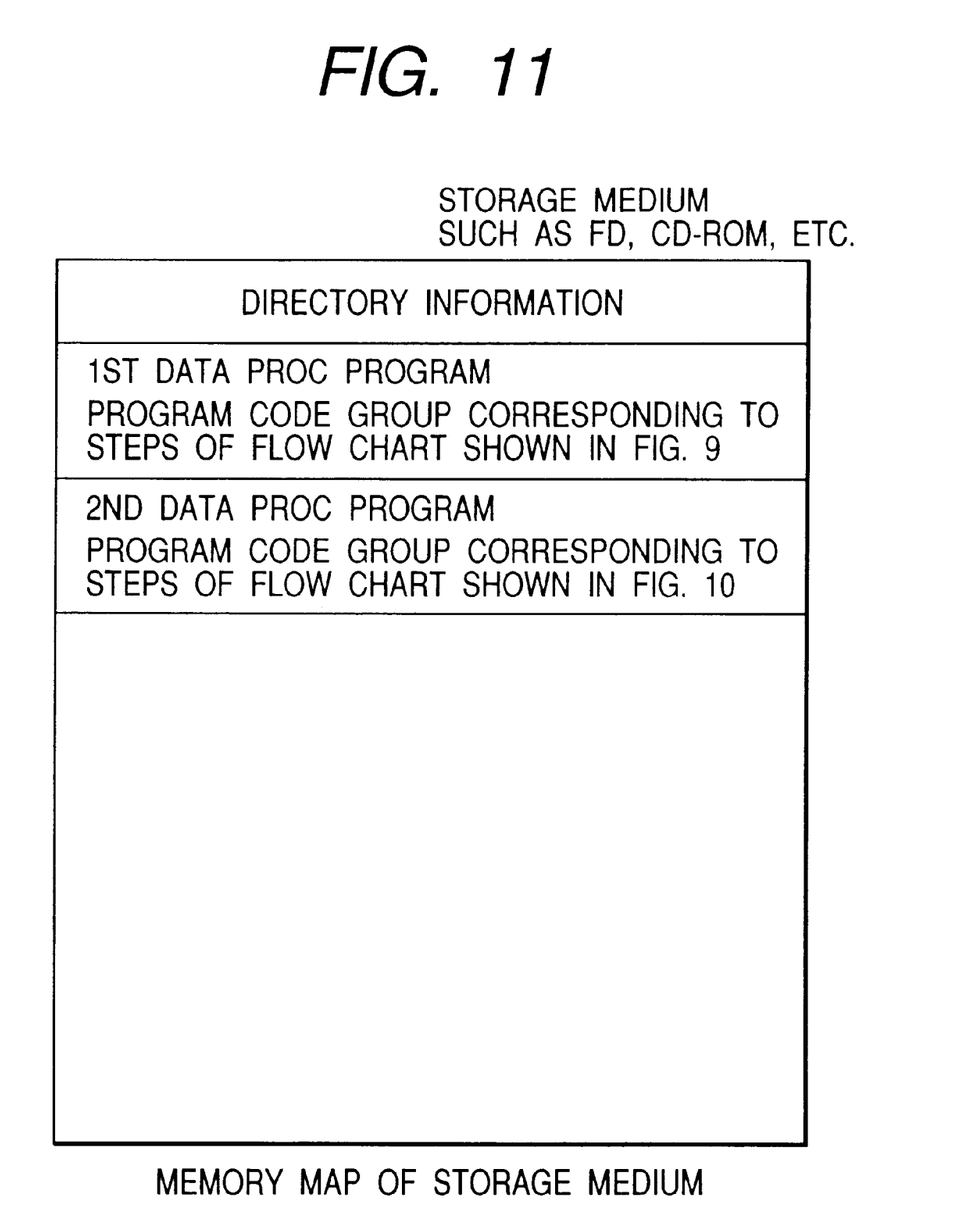
FIG. 11 is a view for explaining a memory map of a storage medium for storing various data processing programs which can be read out by the data processing apparatus according to the present invention.

FIG. 11 is a view for explaining the memory map of a storage medium for storing various data processing programs which can be read out by the data processing apparatus according to the present invention.

Although it is not shown in the drawings, information for managing program group stored in the storage medium, for example, such as version information, an author or the like is also stored and information depending on an OS (operating system) being the program reading side, for example, an icon or the like for discriminatingly displaying a program is also sometimes stored.

Furthermore, data according to various programs is also managed by the above directory. In a case that a program or data to be installed is compressed, a program for the decompression or the like is also sometimes stored.

The functions shown in FIGS. 9 and 10 according to the present invention may be performed by a host computer on the basis of programs installed from an external. In this case, the present invention is applicable in a case that information group including programs is supplied to an output device by a storage medium such as a CD-ROM, a flash memory, an FD or the like, or from an external storage medium through a network.

As described above, it is needless to say that an object of the present invention can be achieved in a case where a storage medium storing the program codes of a software for realizing the functions of the above embodiment is supplied to a system or an apparatus and then a computer (or CPU or MPU) in the system or the apparatus reads and executes the program codes stored in the storage medium.

In this case, the program codes themselves read from the storage medium realize new functions of the present invention, and the storage medium storing such the program codes constitute the present invention.

The storage medium for supplying the program codes can be, for example, a floppy disk, a hard disk, an optical disk, a magnetooptical disk, a CD-ROM, a CD-R, a DVD-ROM, a magnetic tape, a non-volatile memory card, a ROM, an EEPROM, a silicone disk, or the like.

It is needless to say that the present invention also includes not only the case where the functions of the embodiment are realized by the execution of the program codes read by the computer, but also a case where an OS (operating system) or the like functioning on the computer executes all the process or a part thereof according to the instructions of the program codes, thereby realizing the functions of the embodiment.

Further, it is needless to say that the present invention further includes a case where the program codes read from the storage medium are once stored in a memory provided in a function expansion board inserted in the computer or a function expansion unit connected to the computer, and a CPU or the like provided in the function expansion board or the function expansion unit executes all the process or a part thereof according to the instructions of the program codes, thereby realizing the functions of the embodiment.

The present invention is applicable to a system composed of plural equipments or to an apparatus including a single equipment. It is needless to say that the present invention is also applicable to a case of achieving an object by supplying the program to the system or the apparatus. In this case, the system or the apparatus can obtain an effect of the present invention by reading the storage medium, which stores the program represented by a software for achieving the present invention, for the system or the apparatus.

Further, the system or the apparatus can obtain an effect of the present invention by downloading and reading out the program represented by the software for achieving the present invention from the data base on a network based on a communication program.

What is claimed is:

1. An image processing apparatus having a first image processing mode and a second image processing mode, said image processing apparatus comprising:

an operation panel for designating an operation regarding the first image processing mode and the second image processing mode;

a display for displaying information regarding the first image processing mode and the second image processing mode; and a display controller for controlling said display to display first information regarding the first image processing mode and second information regarding the second image processing mode on a first display pattern, wherein said display controller controls said display to display the first information and the second information at least partially at a same location on the first display pattern repeatedly and alternately with each other in a period of time during which said the first mode and the second mode are both in use.

2. An image processing apparatus according to claim 1, wherein said display controller controls said display to display the first information and the second information on the first display pattern alternately, until the operation regarding the first image processing mode is designated by said operation panel.

3. An image processing apparatus according to claim 1, wherein said display controller controls said display not to display the second information and to display the first information on the first display pattern in accordance with a designation regarding the first image processing mode by said operation panel.

4. An image processing apparatus according to claim 3, wherein said operation panel includes a reset key for resetting a designation, and wherein said display controller controls said display to display the second information on the first display pattern when said reset key is touched after the designation regarding the first image processing mode by said operation panel.

5. An image processing apparatus according to claim 3, wherein said display controller controls said display to commence displaying the second information on the first display pattern when no designation has been inputted by said operation panel for a predetermined time since a designation regarding the first image processing mode is inputted by said operation panel.

6. An image processing apparatus according to claim 1, wherein said display controller controls said display not to display the second information when no information regarding the second image processing mode needs to be displayed.

7. An image processing apparatus according to claim 1, wherein said display controller controls said display to display the second information after a mode is changed into the second image processing mode from the first image processing mode.

8. An image processing apparatus according to claim 1, wherein the first image processing mode is a facsimile transmission mode or a copy mode, and the second image processing mode is the other one.

9. An image processing apparatus according to claim 1, wherein the first information is status information regarding the first image processing mode and the second information is status information regarding the second image processing mode.

10. An image processing apparatus according to claim 1, wherein said operation panel includes a mode key for changing from the first image processing mode to the second image processing mode, and wherein said display controller controls said display to display first information regarding the first image processing mode on a second display pattern including information for the second image processing mode in accordance with said mode key being touched.

11. A method for controlling an image processing apparatus having a first image processing mode and a second image processing mode, said method comprising the steps of:

displaying first information regarding the first image processing mode and second information regarding the second image processing mode on a first display pattern including information for the first image processing mode;

suppressing display of the second information in accordance with a designation regarding the first image processing mode; and alternately and repeatedly displaying the first information and the second information at least partially at a same location on the first display pattern.

12. A method according to claim 11, further comprising the step of cancelling said suppressing step when no designation has been inputted for a predetermined time since a designation regarding the first image processing mode is inputted.

13. A method according to claim 11, further comprising the step of cancelling said suppressing step when a reset signal is generated after the designation regarding the first image processing mode.

14. A method according to claim 11, further comprising the step of suppressing display of the second information when no information regarding the second image processing mode needs to be displayed.

15. A method according to claim 11, further comprising the step of displaying the second information in accordance with a change from the first image processing mode to the second image processing mode.

16. A method according to claim 11, wherein the first image processing mode is a facsimile transmission mode or a copy mode, and the second image processing mode is the other one.

17. A method according to claim 11, wherein the first information is status information regarding the first image processing mode and the second information is status information regarding the second image processing mode.

18. A method according to claim 11, further comprising the step of displaying first information regarding the first image processing mode on a second display pattern including information for the second image processing mode in accordance with a changing signal which changes from the first image processing mode to the second image processing mode.

19. A recording medium storing program codes which are able to be read by an image processing apparatus having a first image processing mode and a second image processing mode, said program codes comprising:

a first code for displaying first information regarding the first image processing mode and second information regarding the second image processing mode on a first display pattern including information for the first image processing mode;

a second code for displaying first information regarding the first image processing mode on the first display pattern without displaying the second information on the first display pattern;

a third code for selectively executing said first code and said second code in accordance with presence and absence of designation regarding the first image processing mode, wherein said first code includes a code for alternately and repeatedly displaying the first information and the second information at least partially at a same location on the first display pattern.

20. A recording medium according to claim 19, wherein said third code selects said first code when no designation has been inputted for a predetermined time since a designation regarding the first image processing mode is inputted.

21. A recording medium according to claim 19, wherein said third code selects said first code when a reset signal is generated after the designation regarding the first image processing mode.

22. A recording medium according to claim 19, wherein said third code selects said second code when no information regarding the second image processing mode is needed to be displayed.

23. A recording medium according to claim 19, wherein said third code selects said first code in accordance with a change from the first image processing mode to the second image processing mode.

24. A recording medium according to claim 19, wherein the first image processing mode is a facsimile transmission mode or a copy mode, and the second image processing mode is the other one.

25. A recording medium according to claim 19, wherein the first information is status information regarding the first image processing mode and the second information is status information regarding the second image processing mode.

26. A recording medium according to claim 19, further comprising a code for displaying first information regarding the first image processing mode on a second display pattern including information for the second image processing mode in accordance with a changing signal which changes from the first image processing mode to the second image processing mode.

* * * * *